United States Patent
Trimberger

(10) Patent No.: US 9,608,827 B1
(45) Date of Patent: Mar. 28, 2017

(54) MEMORY CELL WITH DE-INITIALIZATION CIRCUITRY

(71) Applicant: Xilinx, Inc., San Jose, CA (US)

(72) Inventor: Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/997,937

(22) Filed: Jan. 18, 2016

(51) Int. Cl.
*H04L 9/32* (2006.01)
*G11C 11/419* (2006.01)
*G06F 21/44* (2013.01)
*G11C 11/41* (2006.01)
*G06F 21/73* (2013.01)

(52) U.S. Cl.
CPC ............ *H04L 9/3278* (2013.01); *G06F 21/44* (2013.01); *G06F 21/73* (2013.01); *G11C 11/41* (2013.01); *G11C 11/419* (2013.01)

(58) Field of Classification Search
CPC ......... G11C 11/41; G06F 21/44; G06F 21/73; H04L 9/3278
See application file for complete search history.

(56) References Cited

U.S. PATENT DOCUMENTS

| | | | | |
|---|---|---|---|---|
| 8,590,010 | B2* | 11/2013 | Fainstein | G06F 21/44 324/649 |
| 8,934,312 | B2* | 1/2015 | Chu | G11C 29/50 365/154 |
| 2016/0065379 | A1* | 3/2016 | Holcomb | H04L 9/3278 713/189 |

* cited by examiner

*Primary Examiner* — Vanthu Nguyen
(74) *Attorney, Agent, or Firm* — LeRoy D. Maunu

(57) ABSTRACT

Circuits and approaches for de-initializing memory circuits. In one implementation, a memory circuit includes a plurality of memory cells. Each memory cell includes a pair of cross-coupled inverters and first and second access transistors coupled to the pair of cross-coupled inverters. A first bit line is coupled to the first access transistor, and a second bit line is coupled to the second access transistor. A de-initialization circuit is coupled to the first and second bit lines. The de-initialization circuit is configured and arranged to equalize signal states on the first and second bit lines in response to a de-initialization signal.

17 Claims, 5 Drawing Sheets

US 9,608,827 B1

MEMORY CELL WITH DE-INITIALIZATION CIRCUITRY

TECHNICAL FIELD

The disclosure generally relates to an SRAM-based physically unclonable function (PUF) circuit and method.

BACKGROUND

A system's identity may be established and authenticated based on the unique physical properties of the system. In some applications, physically unclonable functions (PUFs) embodied in integrated circuits (ICs) are used to exploit the unique physical characteristics of a system for purposes of authentication. Each instance of the IC will have slightly different physical characteristics due to the random variation in an IC fabrication process. A PUF circuit uses the physical characteristics to generate an identifier value, for example a binary number, which differs from one integrated circuit to the next due to the different physical characteristics of each manufactured device. These identifier values may be used to uniquely identify the integrated circuit, as a key for encryption and decryption, or for other purposes. Examples of circuits used to implement PUFs include delay circuits and ring oscillators, SRAMs, and cross-coupled latches. The terms PUF circuit and PUF may be used interchangeably herein.

PUFs may operate according to a challenge-response protocol. The input to a PUF is the challenge, and the output from the PUF is the response. The slight variations between instances of the PUF circuits in different systems result in the separate instances providing different responses to the same challenge. In addition to identification and authentication, PUF circuits may be used to generate volatile secret keys.

PUFs may be used to protect against unauthorized use of a circuit implemented in programmable logic of a System on Chip (SOC) or a field programmable gate array (FPGA), for example. An efficient implementation of a PUF is desirable in order to contain product costs. An implementation of a PUF that occupies considerable die area may add significantly to the cost of a product without enhancing functionality of the product. In some instances, programmable logic that is unused in implementing a circuit design on a device may be used to implement a PUF. For example, a ring-oscillator PUF may be implemented on unused look-up tables (LUTs) of programmable logic.

SUMMARY

In one embodiment, a memory circuit includes a plurality of memory cells. Each memory cell includes a pair of cross-coupled inverters and first and second access transistors coupled to the pair of cross-coupled inverters. A first bit line is coupled to the first access transistor, and a second bit line is coupled to the second access transistor. A de-initialization circuit is coupled to the first and second bit lines. The de-initialization circuit is configured and arranged to equalize signal states on the first and second bit lines in response to a de-initialization signal.

Another circuit arrangement includes an SRAM circuit arrangement that includes a plurality of memory cells. Each memory cell includes a pair of cross-coupled inverters, a first access transistor coupled to the pair of cross-coupled inverters, and a second access transistor coupled to the pair of cross-coupled inverters. A first bit line is coupled to the first access transistor, and a second bit line is coupled to the second access transistor. A de-initialization circuit is coupled to the first and second bit lines and is configured and arranged to equalize signal states on the first and second bit lines in response to a first state of a de-initialization signal. A physically unclonable function (PUF) control circuit is coupled to the SRAM circuit arrangement. The PUF control circuit is configured and arranged to assert the de-initialization signal to the first state, de-assert the de-initialization signal to a second state, and read and output a PUF value from the SRAM after de-asserting the de-initialization signal to the second state.

In another embodiment, a method of de-initializing an SRAM includes asserting a de-initialization signal to a first state. The method equalizes signal states on each pair of first and second bit lines of each column of memory cells in response to the first state of the de-initialization signal. The de-initialization signal is de-asserted to a second state after the equalizing.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

Figure 1:
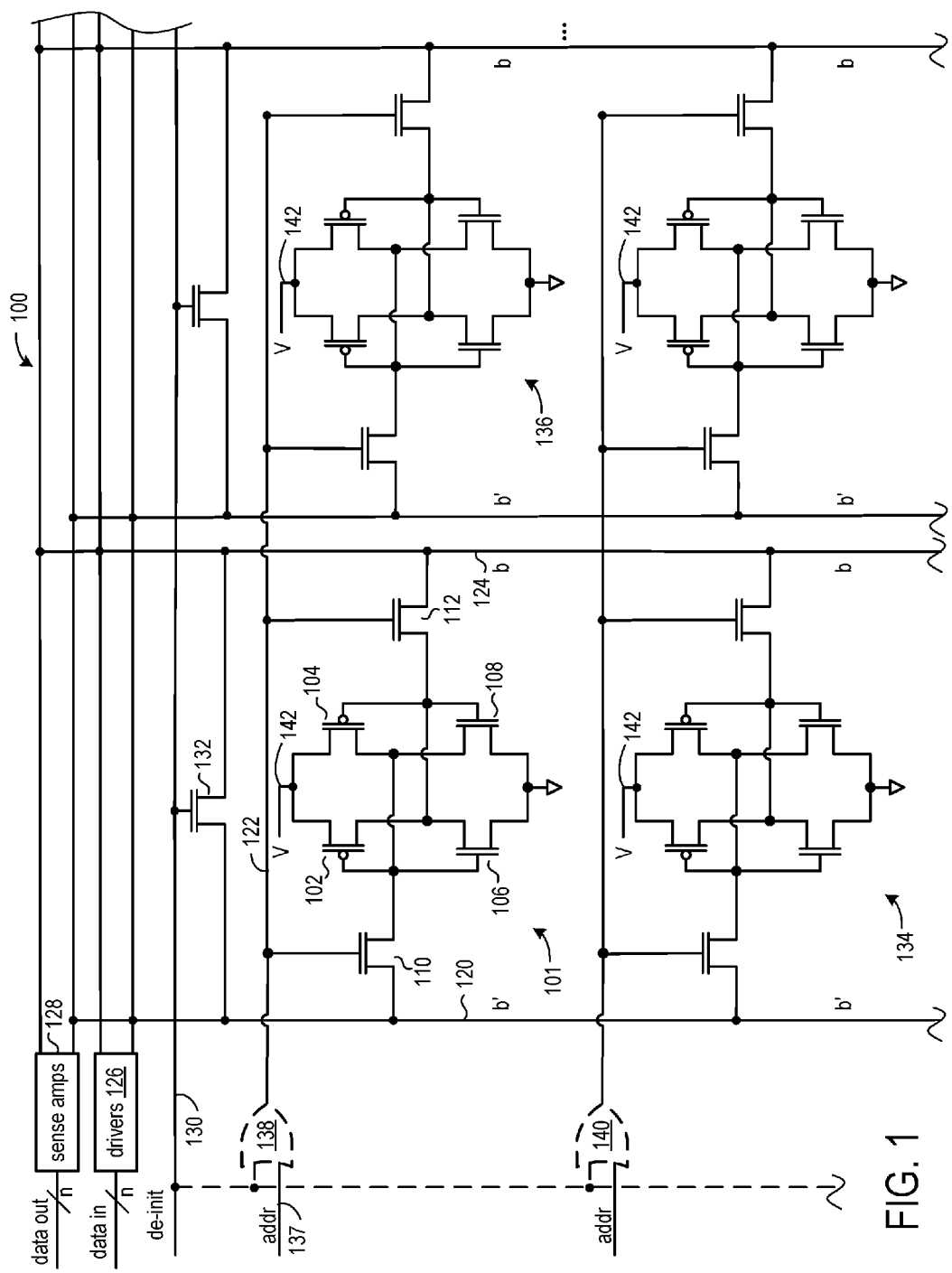
FIG. 1 shows a diagram of a portion of an SRAM circuit arrangement according to one implementation.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

For some applications, a device may employ an SRAM in a PUF circuit. The SRAM may be specifically designed as part of the PUF circuit or may be an SRAM resource that is unused in implementing a design on the device. In order for the PUF circuit to be effective in protecting against adversarial uses of the device, the state of the SRAM must be protected against unauthorized control. However, data remanence may render the SRAM susceptible to attacks, because for some period of time after an SRAM has been powered down, some data that was present in the SRAM prior to power down may persist. Eventually, the data disappears as the charge dissipates from the memory circuitry. However, until the charge dissipates the data in the SRAM may be vulnerable to an attacker.

The disclosed circuits and methods protect an SRAM against attacks by way of a de-initialization circuit that quickly erases values in the cells of the SRAM. In one implementation, the de-initialization circuit is coupled to the complementary bit lines of each memory cell. The de-initialization circuit sets the memory cell value to an intermediate value between 0 and 1. The intermediate value is unstable. The memory cell achieves a stable value based on the manufacturing variation of the individual die once the de-initialization circuit is deactivated. The de-initialization circuit equalizes the signal states on the complementary bit lines in response to a de-initialization signal. In one implementation, the de-initialization circuit creates a short circuit between the complementary bit lines. In another implementation, the de-initialization circuit drives the same bit values on the complementary bit lines.

Though the SRAM circuit arrangements illustrated herein are shown as having 6-transistor ("6T") memory cells, those skilled in the art will recognize that the de-initialization circuitry and approaches described herein may be applied to other SRAM memory cells, for example, 4T, 8T, 10T, 12T and other memory cells.

FIG. 1 shows a diagram of a portion of an SRAM circuit arrangement 100. The illustrated portion of the SRAM circuit arrangement includes two rows and two columns of an SRAM memory array, along with a de-initialization circuit connected to the memory cells for de-initializing the memory cells. Different memory circuits may have different numbers of rows and columns. In the SRAM circuit arrangement 100, the de-initialization circuit short-circuits a connection between the complementary bit lines of the memory cells.

Each memory cell includes a pair of cross-coupled inverters and access transistors. For example, memory cell 101 includes a first inverter that is implemented with transistors 102 and 106 and cross-coupled with a second inverter, which is implemented with transistors 104 and 108. In addition to the cross-coupled inverter arrangement, two or more additional access transistors serve to control the access to the memory cell during read and write operations. Transistors 110 and 112 are respectively coupled to complementary bit lines 120 and 124. During a read or write of the cell, transistors 110 and 112 are enabled by row address line 122. During normal operation, signal line 120 carries the complement of the signal on signal line 124. Also during normal operation, driver circuits 126 drive the signal lines 120 and 124 to complementary states for write operations, and sense amplifiers 128 read the complementary states on the signal lines 120 and 124 for read operations. Driver circuits 126 may drive n pairs of complementary bit lines, with the complementary bit lines in each column connected to one of the n pairs. Similarly, sense amplifiers 128 input the n pairs of complementary bit lines.

The de-initialization circuit includes de-initialization transistors that may be controlled to short-circuit the complementary bit lines of the memory cells. A respective de-initialization transistor connects the complementary bit lines in each column of memory cells. For example, de-initialization transistor 132 connects complementary bit lines 120 and 124 of memory cells 101 and 134, which are in the same column. Each de-initialization transistor is controlled by the de-initialization signal 130. In response to assertion of the de-initialization signal, the de-initialization transistors short-circuit the complementary bit lines in the columns by directly connecting the complementary bit lines in each column.

In one implementation, the rows of memory cells may be de-initialized one at a time while the de-initialization signal 130 is asserted. Alternatively, the memory cells in all the rows may be de-initialized simultaneously in another implementation. The OR gates 138 and 140 are shown with dashed lines as the OR gates are optional. The OR gates 138 and 140 are unnecessary in implementations in which the memory cells may be de-initialized one row at a time, and the OR gates are present in implementations in which the rows of memory cells may be de-initialized simultaneously.

For each row of memory cells, a respective address line controls the access transistors of the memory cells in the row. For example, address line 122 controls the access transistors 110 and 112 of memory cell 101 and the access transistors of memory cell 136, which is in the same row as memory cell 101. In the implementation in which the rows are de-initialized one at a time, the address signal on line 137 is connected directly to the address line 122 (OR gate 138 is not present). To de-initialize the row having memory cells 101 and 136, the address line 138 is asserted along with de-initialization signal 130.

The OR gates 138 and 140 support simultaneous de-initialization of all the memory cells in the array. The de-initialization signal 130 is connected to one of the inputs of each of OR gates 138 and 140 as well as being connected to the control terminal of the de-initialization transistors at the columns of memory cells. Thus, assertion of the de-initialization signal simultaneously enables the access transistors of the memory cells in all the rows of memory cells, as well as connecting the complementary bit lines in all the columns, thereby simultaneously de-initializing all the memory cells in the SRAM circuit arrangement 100.

In one implementation, power may be removed from the memory cells while the de-initialization signal 130 is asserted. For example, the supply voltage 142 may be disabled while the de-initialization signal is asserted. In another implementation, the power to the memory cells may remain enabled while the de-initialization signal is asserted.

Figure 2:
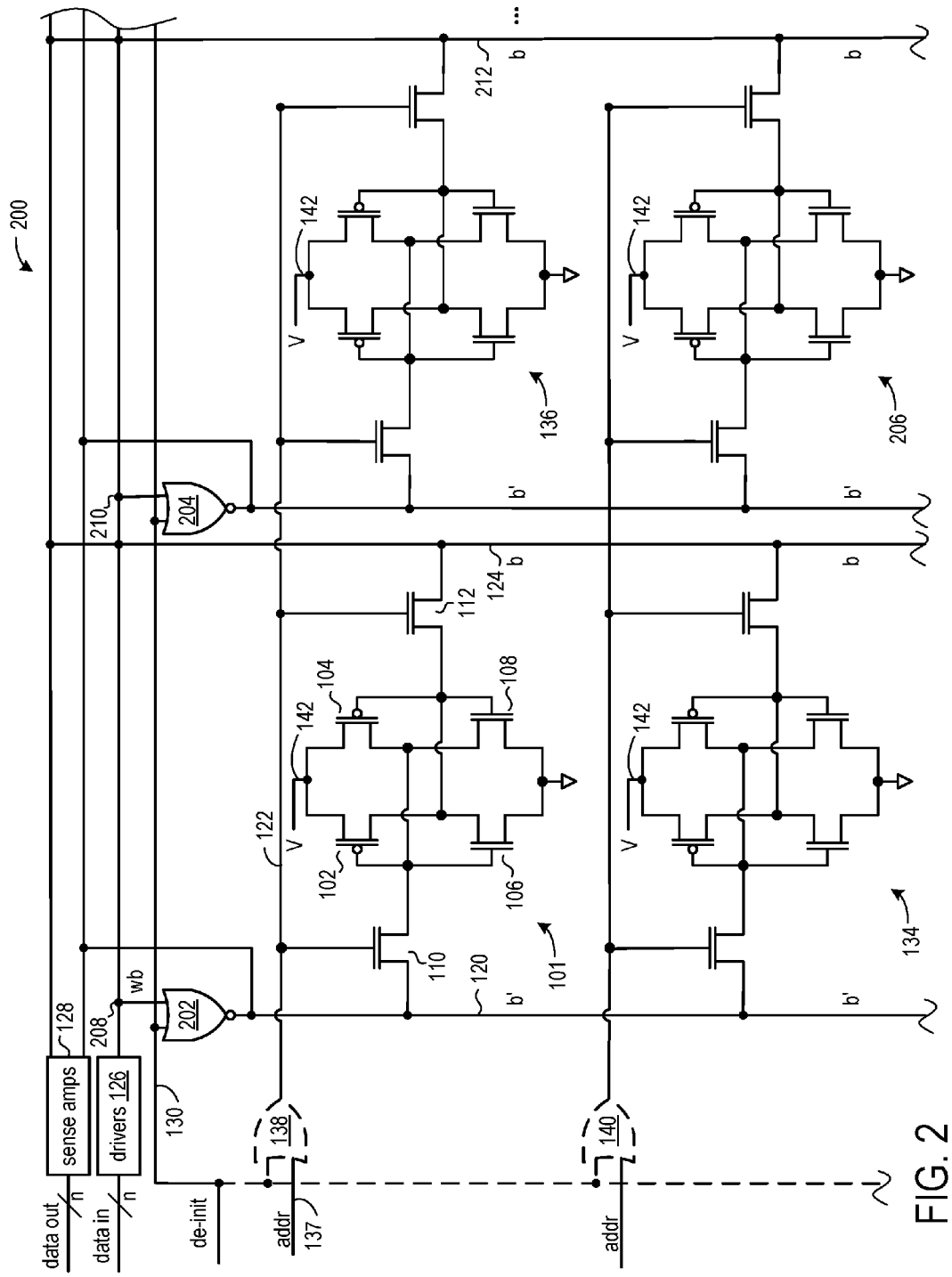
FIG. 2 shows a diagram of a portion of an SRAM circuit arrangement according to another implementation.

FIG. 2 shows a diagram of a portion of an SRAM circuit arrangement 200. The illustrated portion of the SRAM circuit arrangement includes two rows and two columns of an SRAM memory array, along with a de-initialization circuit connected to the memory cells for de-initializing the memory cells. In the SRAM circuit arrangement 200, the de-initialization circuit drives the complementary bit lines of the memory cells to equal signal states.

The de-initialization circuit includes NOR gates that drive the b' bit lines to the same state as the b bit lines during de-initialization. Each column has the output of a respective NOR gate connected to the b' bit line of the columns. For example, the output of NOR gate 202 is connected to the b' bit line 120 of the memory cells 101 and 134 in one column, and the output of NOR gate 204 is connected to the b' bit line of the memory cells 136 and 206 in another column. One input of each NOR gate is connected to the de-initialization signal, and the other input of each NOR is connected to a write-bit node, which carries the output signal line of the driver circuits 126 on which the b bit line of a respective one of the columns is driven. For example, NOR gate 202 has one input connected to the write-bit node 208 that carries the output signal line of the driver circuits 126 that drives b bit line 124, and NOR gate 204 has one input connected to the write-bit node 210 that carries the output signal line of the driver circuits 126 that drives b bit line 212.

For de-initialization, the de-initialization signal 130 is asserted to logic 1, and the wb signal of each bit is de-asserted to logic state 0, resulting in both b' and b=logic 0. When de-initialization signal 130 is logic state 0, b'=not(b).

Those skilled in the art will recognize that alternative de-initialization logic circuits may be constructed to force both b and b'=logic 1.

As with the SRAM circuit arrangement 100 of FIG. 1, the OR gates 138 and 140 are optional. In one implementation, the rows of memory cells may be de-initialized one at a time while the de-initialization signal 130 is asserted. Alternatively, the memory cells in all the rows may be de-initialized simultaneously in another implementation. Also, in one implementation, power may be removed from the memory cells while the de-initialization signal 130 is asserted. For example, the supply voltage 142 may be disabled while the de-initialization signal is asserted. In another implementation, the power to the memory cells may remain enabled while the de-initialization signal is asserted.

Figure 3:
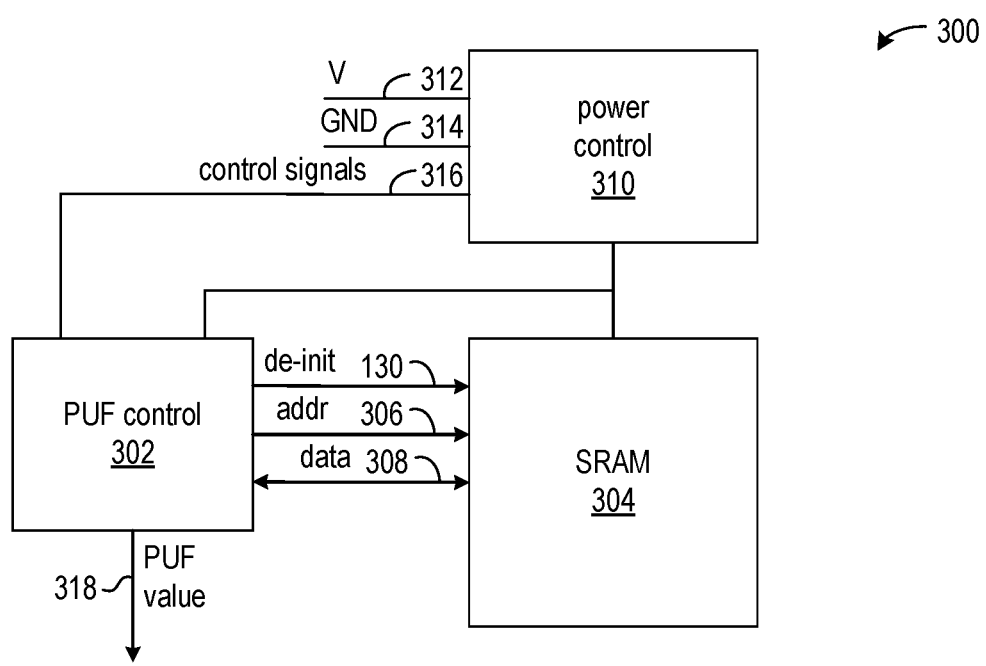
FIG. 3 shows a circuit diagram of an SRAM-based PUF.

FIG. 3 shows a circuit diagram of an SRAM-based PUF 300 according to an example implementation. The PUF control circuit 302 controls the de-initialization signal 130 for de-initializing the SRAM 304 and controls the address signal 306 for de-initializing the SRAM and reading a PUF value. The PUF control circuit may, depending on the implementation, write data to the SRAM for de-initialization. The PUF value read from the SRAM is transmitted on signal line 308. The SRAM may be implemented along with de-initialization circuitry as shown by the SRAM arrangements 100 and 200 described above. The power control circuit 310 generally connects supply 312 and ground 314 voltages to the PUF control circuit 302 and SRAM 304. The power control circuit 310 may in some implementations enable and disable power to the SRAM in response to control signals 316 from the PUF control circuit 302.

The PUF control circuit 302 may initiate de-initialization of the SRAM at different states of operation of the device in which the PUF is deployed. Depending on the device and application of the PUF, the PUF control circuit may initiate de-initialization of the SRAM during power-up sequences and/or power-down sequences of the device. In addition or alternatively, the PUF control circuit may initiate de-initialization of the SRAM during run-time operations.

The PUF control circuit may initiate de-initialization of the SRAM by asserting the de-initialization signal 130. Depending on the implementation of the de-initialization circuitry in the SRAM 304, the PUF control circuit 302 may step through SRAM addresses while the de-initialization signal is asserted. Alternatively, in an implementation in which the de-initialization signal is OR'd with the address signal (FIG. 2, SRAM arrangement 200), the PUF control circuit need not provide an address signal, but hold the de-initialization signal in an asserted state. In an implementation involving the SRAM arrangement 200, the PUF control circuit may drive logic values of 0 on data line 308 during de-initialization. Once de-initialization is complete, the PUF control circuit de-asserts the de-initialization signal and then reads the PUF value from the SRAM. The PUF value may be output on signal line 318 for use by application circuitry.

In one implementation, PUF control circuit 302 may instruct the power control circuit 310 to enable and disable power to the memory cells in the SRAM 304. For example, in some applications, benefits may be realized by powering down the memory cells of the SRAM 304 prior to asserting the de-initialization signal 130. After de-initialization, the PUF control circuit may signal the power control circuit 310 to enable power to the memory cells of the SRAM, assuming the de-initialization was not part of a power-down sequence.

Figure 4:
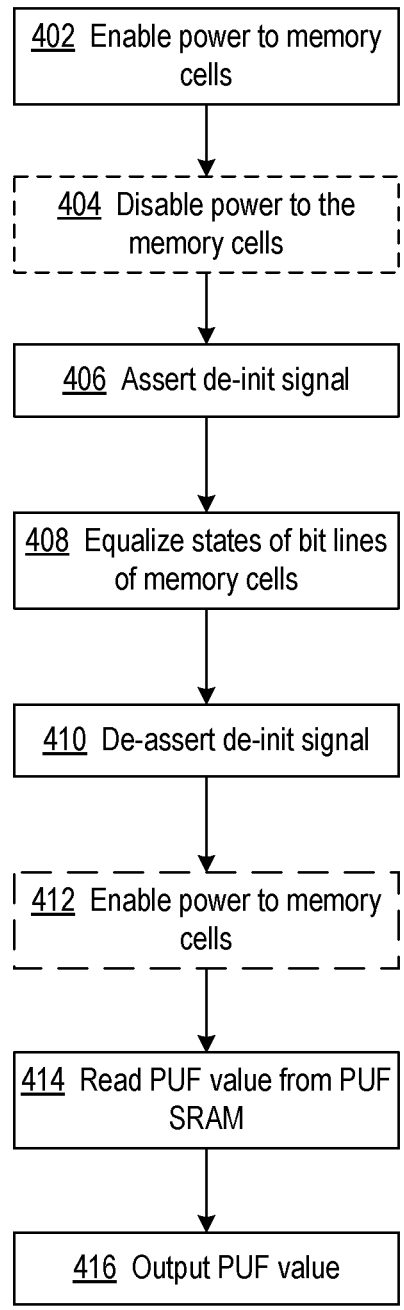
FIG. 4 shows a flowchart of a process in which an SRAM is de-initialized.

FIG. 4 shows a flowchart of a process in which an SRAM is de-initialized. The SRAM may be de-initialized as part of a power-up sequence, part of a power-down sequence, or during run-time operation of the device on which the SRAM is used in a PUF.

At block 402, power may be enabled to the memory cells of the SRAM. If the de-initialization is to be performed during a power-down sequence or during run-time operations of a device that accesses the SRAM, power to the SRAM may have been enabled as part of a previously performed power-up sequence. If the de-initialization is to be performed as part of a power-up sequence of a device or power-up of the SRAM, power to the SRAM may be enabled after de-initialization of the SRAM is complete.

Power to the memory cells of the SRAM may be optionally disabled at block 404. In one implementation, the SRAM memory cells may have power enabled while signal states on the pairs of complementary bit lines are equalized, and in another implementation, the SRAM memory cells may have power disabled while signal states on the pairs of complementary bit lines are equalized. De-initializing an SRAM with power on may de-initialize the SRAM more quickly and de-initialize the SRAM to a different, more predictable state than de-initializing an SRAM with power off. An SRAM de-initialized with power off may de-initialize to a state more closely resembling a power-on state, which may be preferred in some PUF applications.

The de-initialization signal is asserted at block 406. The state to which the de-initialization signal is asserted signals the aforementioned de-initialization circuitry to equalize the states of the pairs of bit lines of the memory cells. At block 408, the process equalizes the signal states in each pair of complementary bit lines. The signal states may be equalized by short-circuiting each pair of bit lines or by driving equivalent signal states on the bit lines of each pair. In one implementation, row addresses may be input to the SRAM while the de-initialization signal is asserted. In another implementation, the signal states of the complementary bit lines may be simultaneously equalized by addressing all the rows of the SRAM at once and driving a logic 0 value on the bit lines while the de-initialization signal is asserted, such as in the SRAM circuit arrangement of FIG. 2. In either implementation, power to the memory cells may be either enabled or disabled while the de-initialization signal is asserted and the signal states on the pairs of bit lines are equalized.

At block 410, the process de-asserts the de-initialization signal to a state that does not cause equalization of the signals on the bit lines. Enabling power to the memory cells at block 412 is optional and depends on whether or not power was disabled at block 404.

At block 414, the process reads a PUF value from the SRAM, and at block 416, the PUF value is output. The PUF value may be output to application circuitry to be used in authentication and/or encryption and decryption processes, for example. The processing of blocks 404-416 may be repeated to de-initialize the SRAM and read the PUF value multiple times according to application requirements.

Figure 5:
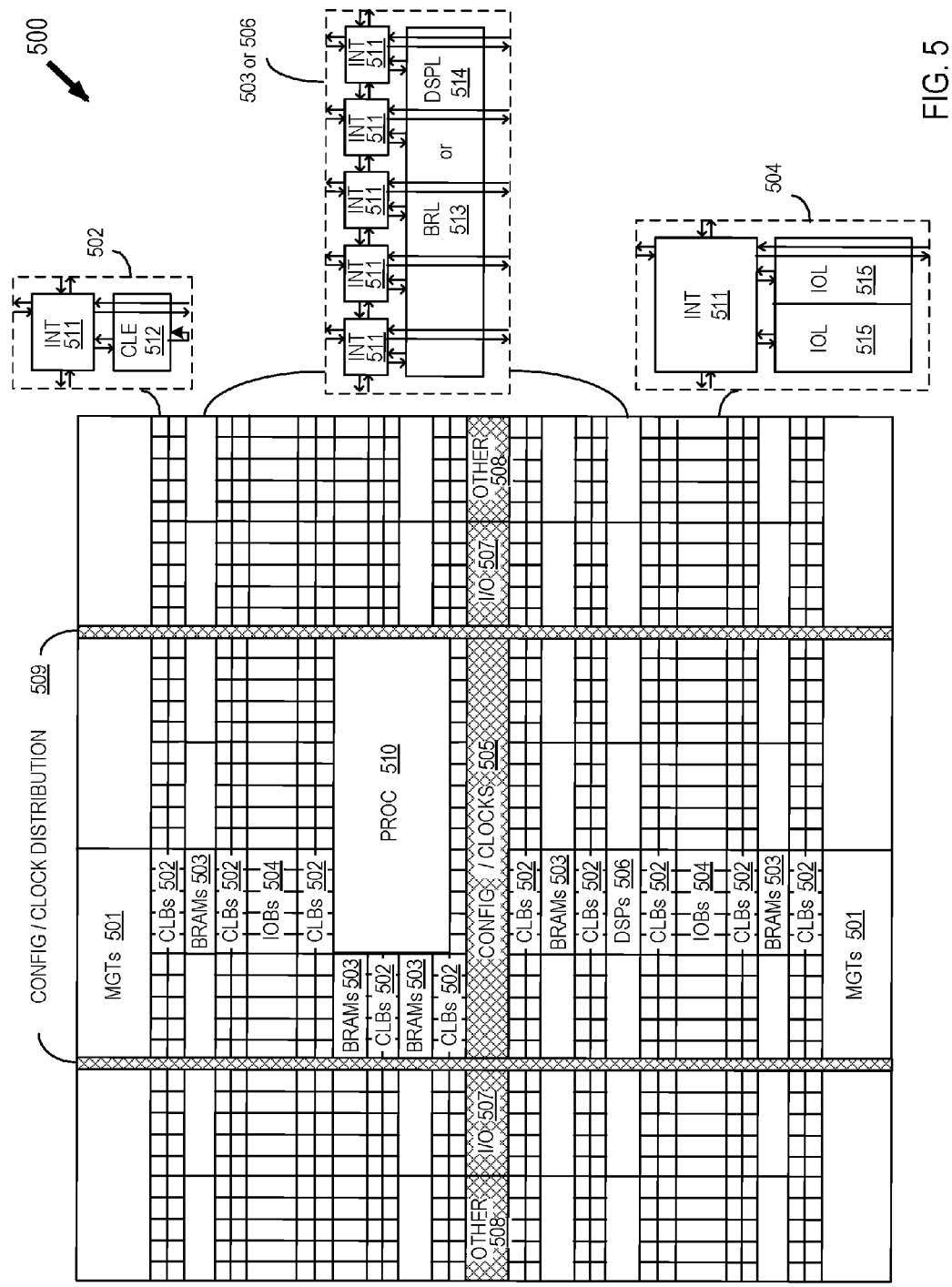
FIG. 5 shows an example programmable logic IC on which the disclosed SRAM, PUF circuitry and associated processes may be implemented.

FIG. 5 shows an example programmable logic IC 500 on which the disclosed SRAM, PUF circuitry and associated processes may be implemented. The programmable logic and interconnect circuitry, as described further below, may be configured to implement the PUF control circuit 302 of FIG. 3. Alternatively, the processor 510 may be configured to execute software to implement the PUF control circuit. One or more of the BRAMs 503 may implement the SRAM 304 used for the PUF.

Field programmable gate arrays (FPGAs) can include several different types of programmable logic blocks in the array. For example, the architecture of FIG. 5 includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, e.g., clock ports, and other programmable logic 508 such as power control circuitry, digital clock managers, analog-to-digital converters, system monitoring logic, and so forth. Some FPGAs also include dedicated processor blocks (PROC 510) and internal and external reconfiguration ports (not shown).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 506 can include a DSP logic element (DSPL 514) in addition to an appropriate number of programmable interconnect elements. An 10B 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured FPGA, a horizontal area near the center of the die (shown shaded in FIG. 5) is used for configuration, clock, and other control logic. Vertical areas 509 extending from this horizontal area are used to distribute the clocks and configuration signals across the breadth of the FPGA.

Some FPGAs utilizing the architecture illustrated in FIG. 5 include additional logic blocks that disrupt the regular row structure making up a large part of the FPGA. The additional logic blocks can be programmable blocks and/or dedicated logic. For example, the processor block PROC 510 shown in FIG. 5 spans several rows of CLBs and BRAMs.

Note that FIG. 5 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for de-initialization of an SRAM. Other aspects and features will be apparent to those skilled in the art from consideration of the specification. Certain aspects may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A memory circuit, comprising:
   a plurality of memory cells, each memory cell including:
      a pair of cross-coupled inverters;
      a first access transistor coupled to the pair of cross-coupled inverters; and
      a second access transistor coupled to the pair of cross-coupled inverters;
   a first bit line coupled to the first access transistor;
   a second bit line coupled to the second access transistor;
   a de-initialization circuit coupled to the first and second bit lines, wherein the de-initialization circuit is configured and arranged to equalize signal states on the first and second bit lines in response to a first state of a de-initialization signal; and
   a control circuit coupled to the de-initialization circuit, wherein the control circuit is configured and arranged to:
      enable power to the plurality of memory cells,
      disable power to the plurality of memory cells after the enabling of power to the plurality of memory cells,
      assert the de-initialization signal to the first state while power is disabled to the plurality of memory cells,
      de-assert the de-initialization signal to a second state after the equalizing and while power is disabled to the plurality of memory cells.

2. The memory circuit of claim 1, wherein the de-initialization circuit includes a transistor coupled between the first and second bit lines and the transistor is arranged to short-circuit the first and second bit lines in response to the de-initialization signal.

3. The memory circuit of claim 1, wherein in each memory cell:
   the first bit line of the memory cell is coupled to a write-bit node; and
   the de-initialization circuit includes a logic circuit arranged to drive the signal state on the second bit line to a signal state equivalent to the signal state of the write-bit node in response to a first state of the de-initialization signal and to drive the signal state on the second bit line to a signal state opposite the signal state of the write-bit node in response to a second state of the de-initialization signal.

4. The memory circuit of claim 1, wherein:
   the plurality of memory cells are arranged in columns and rows;
   the memory circuit further includes a plurality of address lines, wherein each respective address line of the plurality of address lines is coupled to the first and second access transistors of the memory cells in one of the rows; and
   the de-initialization circuit is further configured and arranged to simultaneously enable the first and second access transistors coupled to the plurality of address lines in response to the de-initialization signal.

5. A circuit arrangement, comprising:
an SRAM circuit arrangement including a plurality of memory cells, each memory cell including:
   a pair of cross-coupled inverters;
   a first access transistor coupled to the pair of cross-coupled inverters; and
   a second access transistor coupled to the pair of cross-coupled inverters;
a first bit line coupled to the first access transistor;
a second bit line coupled to the second access transistor;
a de-initialization circuit coupled to the first and second bit lines, wherein the de-initialization circuit is configured and arranged to equalize signal states on the first and second bit lines in response to a first state of a de-initialization signal; and
a physically unclonable function (PUF) control circuit coupled to the SRAM circuit arrangement, wherein the PUF control circuit is configured and arranged to:
   enable power to the plurality of memory cells,
   disable power to the plurality of memory cells after the enabling of power to the plurality of memory cells,
   assert the de-initialization signal to the first state while power is disabled to the plurality of memory cells,
   de-assert the de-initialization signal to a second state after the equalizing and while power is disabled to the plurality of memory cells,
   enable power to the plurality of memory cells after the de-assertion of the de-initialization signal,
   read a PUF value from the SRAM circuit arrangement after enabling power after the de-asserting the de-initialization signal to the second state, and
   output the PUF value.

6. The circuit arrangement of claim 5, wherein the de-initialization circuit includes a transistor coupled between the first and second bit lines and the transistor is arranged to short-circuit the first and second bit lines in response to the de-initialization signal.

7. The circuit arrangement of claim 5, wherein in each memory cell:
the first bit line of the memory cell is coupled to a write-bit node; and
the de-initialization circuit includes a logic circuit arranged to drive the signal state on the second bit line to a signal state equivalent to the signal state of the write-bit node in response to a first state of the de-initialization signal and to drive the signal state on the second bit line to a signal state opposite the signal state of the write-bit node in response to a second state of the de-initialization signal.

8. The circuit arrangement of claim 5, wherein:
the plurality of memory cells are arranged in columns and rows;
the SRAM circuit arrangement further includes a plurality of address lines, wherein each respective address line of the plurality of address lines is coupled to the first and second access transistors of the memory cells in one of the rows; and
the de-initialization circuit is further configured and arranged to simultaneously enable the first and second access transistors coupled to the plurality of address lines in response to the de-initialization signal.

9. The circuit arrangement of claim 5, further comprising:
a plurality of configurable logic blocks coupled to the SRAM circuit arrangement; and
a plurality of programmable interconnect elements coupled to the SRAM circuit arrangement.

10. The circuit arrangement of claim 9, wherein the PUF control circuit is implemented in the plurality of configurable logic blocks and the plurality of programmable interconnect elements.

11. A method of de-initializing an SRAM, the SRAM including rows and columns of memory cells and respective pairs of first and second bit lines coupled to the columns of memory cells, comprising:
enabling power to the rows and columns of memory cells in the SRAM;
disabling power to the rows and columns of memory cells after the enabling of power to the rows and columns of memory cells;
asserting a de-initialization signal to a first state while power is disabled to the rows and columns of memory cells;
equalizing signal states on each pair of first and second bit lines in response to the first state of the de-initialization signal and while power is disabled to the rows and columns of memory cells; and
de-asserting the de-initialization signal to a second state after the equalizing.

12. The method of claim 11, wherein the equalizing includes short-circuiting each pair of first and second bit lines.

13. The method of claim 11, wherein the equalizing includes driving each pair of first and second bit lines to a value on a write-bit node.

14. The method of claim 11, further comprising simultaneously addressing the rows of memory cells in response to the de-initialization signal.

15. The method of claim 11, further comprising addressing each row of the rows of memory cells one at a time.

16. The method of claim 11, further comprising:
enabling power to the plurality of memory cells after de-asserting the de-initialization signal;
reading a PUF value from the SRAM after enabling power after de-asserting the de-initialization signal; and
outputting the PUF value.

17. The method of claim 16, further comprising, after the de-asserting the de-initialization signal:
repeating the disabling power to the to the rows and columns of memory cells after reading the PUF value;
repeating the asserting of the de-initialization signal to the first state after repeating the disabling of power;
repeating the equalizing the signal states on each pair of first and second bit lines in response to the first state of the de-initialization signal;
repeating the de-asserting the de-initialization signal to the second state after the repeating of the equalizing;
repeating the enabling of power to the rows and columns of memory cells after repeating the de-asserting the de-initialization signal;
reading another PUF value from the SRAM after repeating the enabling of power after the de-asserting of the de-initialization signal; and
outputting the other PUF value.

* * * * *